US012734097B2

(12) United States Patent
Ren

(10) Patent No.: US 12,734,097 B2
(45) Date of Patent: Sep. 15, 2026

(54) FLEXIBLE SLIDING POWER SUPPLY ASSEMBLY, AND MASSAGE CUSHION AND CONTROL METHOD THEREFOR

(71) Applicant: Shenzhen Mondial Technology Co.,Ltd., Shenzhen (CN)

(72) Inventor: Changhui Ren, Shenzhen (CN)

(73) Assignee: Shenzhen Mondial Technology Co., Ltd., Shenzhen (CN)

( * ) Notice: Subject to any disclaimer, the term of this patent is extended or adjusted under 35 U.S.C. 154(b) by 516 days.

(21) Appl. No.: 17/787,949

(22) PCT Filed: Apr. 8, 2021

(86) PCT No.: PCT/CN2021/000073
§ 371 (c)(1),
(2) Date: Jun. 22, 2022

(87) PCT Pub. No.: WO2022/126798
PCT Pub. Date: Jun. 23, 2022

(65) Prior Publication Data

US 2024/0164981 A1 May 23, 2024

(30) Foreign Application Priority Data

Dec. 17, 2020 (CN) ......................... 202011496068.5

(51) Int. Cl.
*A61H 15/00* (2006.01)
*H01R 25/14* (2006.01)

(52) U.S. Cl.
CPC ....... *A61H 15/0078* (2013.01); *H01R 25/142* (2013.01); *H01R 25/147* (2013.01);
(Continued)

(58) Field of Classification Search
CPC ........ A61H 15/0078; A61H 2201/0134; A61H 2201/0142; A61H 2201/0146;
(Continued)

(56) References Cited

U.S. PATENT DOCUMENTS

| | | | | | |
|---|---|---|---|---|---|
| 5,561,271 | A * | 10/1996 | Bruck | H01R 25/16 | 439/492 |
| 6,283,928 | B1 * | 9/2001 | Wang | A61H 7/007 | 601/99 |
| 6,808,500 | B1 * | 10/2004 | Cheng-Yi | A61H 15/0078 | 601/134 |
| 7,419,475 | B2 * | 9/2008 | Ferber | A61H 7/004 | 601/134 |

(Continued)

FOREIGN PATENT DOCUMENTS

| | | | |
|---|---|---|---|
| CN | 209611675 | Y | 11/2019 |
| CN | 209827440 | A | 12/2019 |

(Continued)

*Primary Examiner* — Douglas Y Sul

(57) ABSTRACT

The present disclosure discloses a flexible sliding power supply assembly, and a massage cushion and a control method therefor. A flexible conductive rail is provided with two or more fixing slots; conductive bars are mounted in the fixing slots in an embedded manner; a sliding conductive assembly is mounted on the flexible conductive rail; the sliding conductive assembly is in slidably electric connection with the conductive bars; and the conductive bars are correspondingly electrically connected to a power supply and a controller. The flexible conductive rail of the present disclosure can bend in a large arc in one direction to adapt to massage chairs with different shapes, so that the adaptability is good, and it can be used for both a common cushion and a curved cushion. In the flexible conductive rail, the tunnel type sliding conductive assembly can be made to be a standard component, so that it adapts to various kinds of cushions, the development cost is reduced, and assembling is facilitated. The flexible conductive rail is connected by a tunnel type probe control sleeve structure, so that reliable fixing is achieved during sliding guidance. In the present disclosure, one controller can be connected to a
(Continued)

plurality of massage movements with the tunnel type sliding conductive assemblies, so that the number of wires is reduced, and the problems of breakage of wires of the massage cushion and twining of the wires on a massage head are completely solved.

11 Claims, 6 Drawing Sheets

(52) U.S. Cl.
CPC ................ *A61H 2201/0107* (2013.01); *A61H 2201/0134* (2013.01); *H01R 2201/12* (2013.01)

(58) Field of Classification Search
CPC .... A61H 2201/0149; A61H 2201/5066; A61H 2201/5064; A61H 2201/1669; H01R 25/14–147
See application file for complete search history.

(56) References Cited

U.S. PATENT DOCUMENTS

| | | | | |
|---|---|---|---|---|
| 2005/0245851 | A1* | 11/2005 | Ferber | A61H 23/0263 601/87 |
| 2014/0343467 | A1* | 11/2014 | Fukuyama | A61H 9/0078 601/98 |
| 2016/0257500 | A1* | 9/2016 | Reischl | B65G 23/08 |
| 2018/0283661 | A1* | 10/2018 | Zanotto | F21S 4/20 |
| 2020/0207241 | A1* | 7/2020 | Moulin | B60N 2/502 |
| 2021/0053764 | A1* | 2/2021 | Hofer | H02G 5/025 |
| 2021/0159653 | A1* | 5/2021 | Caldwell | H02K 13/003 |
| 2022/0031560 | A1* | 2/2022 | Chiu | A61H 15/0078 |

FOREIGN PATENT DOCUMENTS

| | | | |
|---|---|---|---|
| CN | 110836337 | Y | 2/2020 |
| CN | 112510458 | P | 3/2021 |
| DE | 102015001154 | A | 8/2016 |
| DE | 102016204103 | A | 9/2017 |

* cited by examiner

FLEXIBLE SLIDING POWER SUPPLY ASSEMBLY, AND MASSAGE CUSHION AND CONTROL METHOD THEREFOR

TECHNICAL FIELD

The present disclosure relates to the field of massagers, specifically to a flexible sliding powers supply assembly, and a massage cushion and a control method therefor.

BACKGROUND

A massager belongs to a kind of conventional health care equipment. The massager has several soft-touch massage heads, which can relax muscles, soothe nerves, promote blood circulation, relieve fatigue, significantly reduce various chronic pains, acute pains and muscle soreness, relax the body and reduce stress. As a massager, a massage cushion is convenient to install and use, and is widely used in automobiles seats, office chairs, or sofas.

With the improvement of people's living standards, demands for the massage cushion in the market are more and more diversified. In order to make the massage cushion suitable for massage on various kinds of seats, the massage cushions are increasingly, required to be light and thin. When a traditional massage movement walks, since a spring-shape wire has a too large diameter, it is impossible to make the massage cushion thinner while conforming to the human curve.

If a special mold is used to improve the problem that a fixed conductive rail occupies a large space, the massage cushion needs to be customized according to the shape of a seat, so that the development cost is high and the development period is long. When the whole is thinner, a guide rail may be prone to problems such as intermittent poor contact and derailment.

At the same time, in order to massage multiple areas at the same time, the existing massage cushion is usually provided with multiple groups of movements. When a power supply main board is controlled to be connected to power or communicate with the multiple groups of movements, each connected movement is connected by one wire, resulting in that more movements require move wires, so that the machining difficulty is high, and the assembling and maintenance cost is high.

Up-and-down action of the massage movement of the existing massage cushion in the prior art mainly relies on the following three conductive connection manners:

The first manner is wire connection. A wire can be bent to be folded and unfolded. With the up-and-down action of the massage movement, since a moving trajectory of the wire cannot be fixed, the massage movement cannot effectively avoid a position where a person can squeeze, so that after the wire is squeezed by an external force and the person, the moving trajectory will change, or the wire cannot be bent and unfolded, which makes the wire broken or twined on a massage head. As a result, a product malfunctions, and frequent folding and unfolding of the wire will cause a copper wire inside the wire to be broken.

The second manner is spring-shape wire connection. However, since a spring-shape wire is spiral, the diameter of the wire will increase. When moving on a thinner cushion shell, the spring-shape wire will be easily squeezed by a person, causing a malfunction. Furthermore, if the spring-shape wire is frequently stretched and bent, a copper wire in it will also be broken.

The third manner is fixed conductive guide rail connection. In this conductive connection method, special conductive guide rails need to be customized and designed for each kind of massage chairs with different shapes, and a special mold needs to be opened. Furthermore, a fixed conductive guide rail occupies a large space, has high development cost, and long development period. When the massage movement moves or there is debris on the guide rail, the problems of poor intermittent contact, derailment, and the like occur.

There are also massage chairs that use electrified guide rails, such as a novel conductive structure of a massage chair movement ZL201820665485.X, a guide rail of which is of a rigid structure and cannot be used for massagers with certain flexibility, such as a massage cushion. Meanwhile, due to the rigid structure, in order to satisfy the use of different types of equipment, customized molds need to be used, so the cost will increase significantly.

SUMMARY

For the above problems, the present disclosure aims to provide a flexible sliding power supply assembly with stable structure, good contact and low manufacturing cost, and a massage cushion and a control method therefor.

In order to achieve the technical objective, a solution of the present disclosure is as follows: A flexible sliding power supply assembly includes a flexible conductive rail and a sliding conductive assembly. The flexible conductive rail is provided with two or more fixing slots, and conductive bars are mounted in the fixing slots in an embedded manner.

The sliding conductive assembly is mounted on the flexible conductive rail; the sliding conductive assembly is in slidably electric connection with the conductive bars; and the conductive bars are correspondingly electrically connected to a power supply and a controller.

As a preference, the sliding conductive assembly includes a probe control sleeve, conductive probes, and a circuit board; the circuit board is mounted in the probe control sleeve; and the circuit board is electrically connected with a plurality of conductive probes.

The middle part of the probe control sleeve is a connecting opening; by the connecting opening, the probe control sleeve is capable of being mounted on the flexible conductive rail; and the conductive probes protrude from the connecting opening and are electrically connected to the conductive bars on the flexible conductive rail.

As a preference, one side of the probe control sleeve is provided with a connecting part fixedly connected to a massage movement; and each conductive bar is correspondingly electrically connected to one or more conductive probes.

Each conductive probe is formed by combining a copper pin, a spring and a wire.

As a preference, one or more magnets are mounted on a flexible conductive rail in an embedded manner; a hall switch is mounted on the circuit board of the massage movement; and the hall switch can determine the position of the movement by sensing a magnetic field formed by the magnets.

As a preference, the fixing slots are "凹"-shaped; each fixing slot includes a fixed part and an opening part; a width and thickness of the fixed part are both equal to those of each conductive bar; a width of the opening part is less than that of the conductive bar; and a thickness of the opening part is less than an extending height of the conductive probe.

A massage cushion adopts the flexible sliding power supply assembly. The flexible conductive rail is fixedly mounted on a cushion body; the other side of the cushion body is further provided with a rack; and one or more massage movements are mounted between the flexible conductive rail and the rack.

One side of each massage movement is meshed with the rack; the other side of the massage movement is fixedly provided with the sliding conductive assembly; and the massage movement is electrically connected with each conductive bar through the sliding conductive assembly.

As a preference, the fixing slots of the flexible conductive rail are inwardly disposed; the circuit board of the probe control sleeve and one side of each conductive probe is inwardly disposed; and a massage head on each massage movement is outwardly disposed.

An upper surface and a lower surface of the probe control sleeve are both of arc curved structures.

A control method is applied to a massage cushion. The flexible conductive rail is provided with three conductive bars; two conductive bars are used for supplying power, and the third conductive bar is used for controlling signals; the conductive bars are also electrically connected with a controller; the circuit board is also electrically connected with a micro control unit (MCU); and the control method specifically includes the following steps:

- S1, control: issuing, by means of a mobile phone or the controller, an instruction; encoding the instruction through a communication protocol; transmitting the encoded instruction to the MCU via a specified conductive bar; and decoding, by the MCU, the encoded instruction to control the massage movement to perform a specified action; and
- S2, feedback: when the massage movement switches a mode or stops working, encoding, by the MCU, a state; transmitting the encoded state to the controller via a specified conductive bar; and decoding, by a central processing unit (CPU) on the controller, the encoded state to obtain a working state of the massage movement.

As a preference, the control method further includes step S3, positioning: sensing, by the MCU, a magnet on a flexible conductive rail of the cushion body through the hail switch on the circuit board; after the MCU determines the position of the massage movement, encoding, by the MCU, position information; transmitting the encoded position information to the controller via a specified conductive bar; and decoding, by the CPU on the controller, the encoded position information to obtain the position information of the massage movement.

The present disclosure has the beneficial effects. The flexible conductive rail in the sliding power supply assembly of the present disclosure is made of high-toughness engineering plastic. The flexible conductive rail can bend in a large arc in one direction to adapt to massage chairs with different shapes, so that the adaptability is good, and it can be used for both a common cushion and a curved cushion. In the flexible conductive rail, the tunnel type sliding conductive assembly can be made to be a standard component, thus adapting to various kinds of cushions, reducing the development cost, facilitating the assembling, reducing the kinds of materials, and decreasing the product cost. The flexible conductive rail is connected by the tunnel type probe control sleeve structure, so that reliable fixing is achieved during sliding guidance, and the problem of derailment is completely solved. Each conductive bar corresponds to two conductive probes. The parallel conductive probes have good contact-conducting stability, so that the problem of poor contact easily caused in the existing fixed conductive rail is solved. In the flexible conductive rail of the present disclosure, one controller can be connected to a plurality of massage movements with the tunnel type sliding conductive assemblies by only three conductive bars, so that the number of wires is reduced, and the problems of breakage of wires of the massage cushion and twining of the wires on a massage head are completely solved. The flexible conductive rail has a normative appearance and a compact structure, and the moving trajectory can be fixed according to the movement. The sliding conductive assembly is located on a side surface. One protruding end of the circuit board of the sliding conductive assembly is located on an inner side, and at the same time, the upper and lower end parts of the sliding conductive assembly are both arc-shaped, so that a position where a person easily squeezes can be bypassed; a product has more stable quality; and the person feels more comfortable during massage.

DETAILED DESCRIPTION OF THE EMBODIMENTS

The present disclosure is further described in detail below in combination with the accompanying drawings and specific embodiments.

Figure 1:
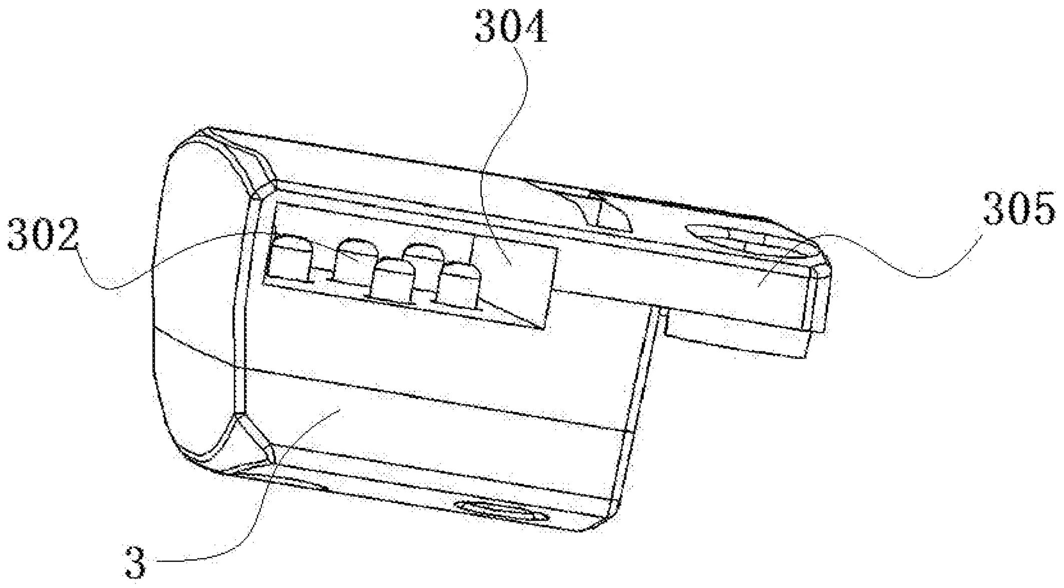
FIG. 1 is a schematic structural diagram of a sliding conductive assembly of the present disclosure.
Figure 2:
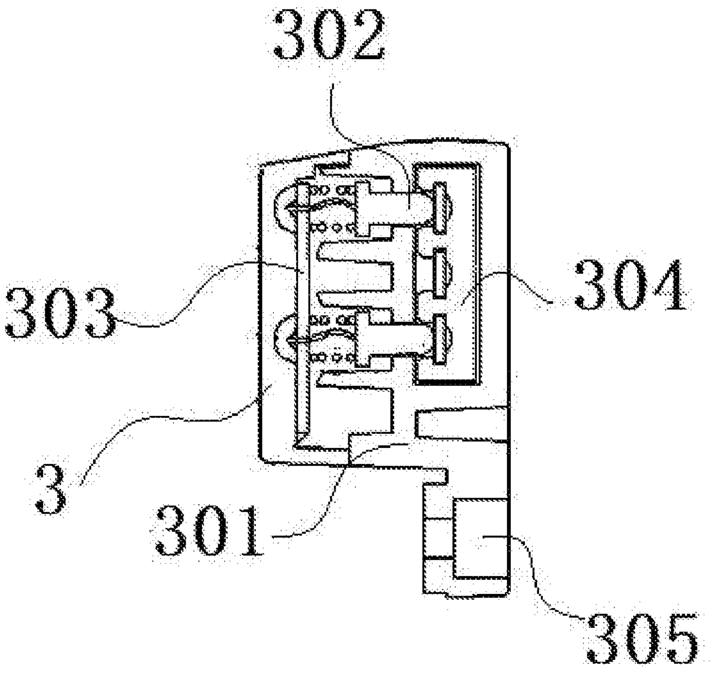
FIG. 2 is a sectional view of a sliding conductive assembly of the present disclosure.
Figure 3:
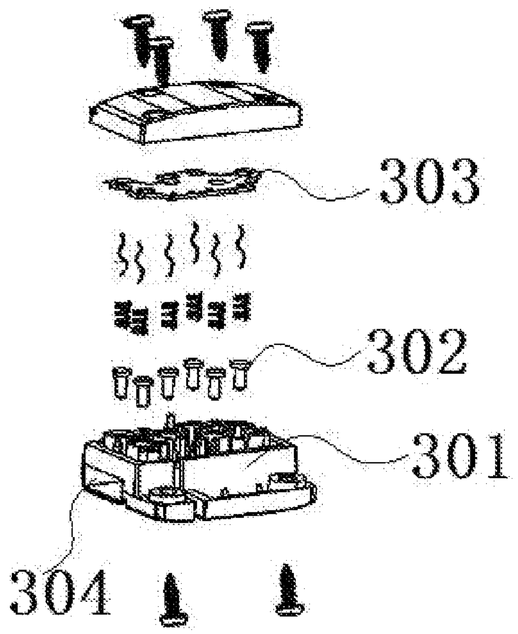
FIG. 3 is an exploded diagram of a sliding conductive assembly of the present disclosure.
Figure 4:
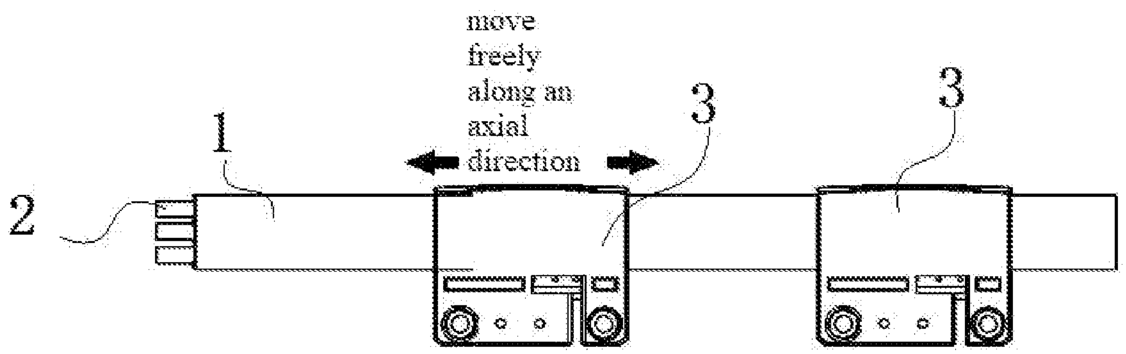
FIG. 4 is a schematic structural diagram of the present disclosure.
Figure 5:
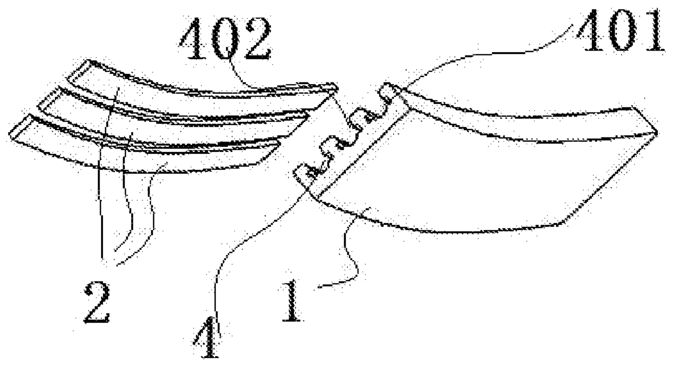
FIG. 5 is an exploded diagram of a flexible conductive rail of the present disclosure.
Figure 6:
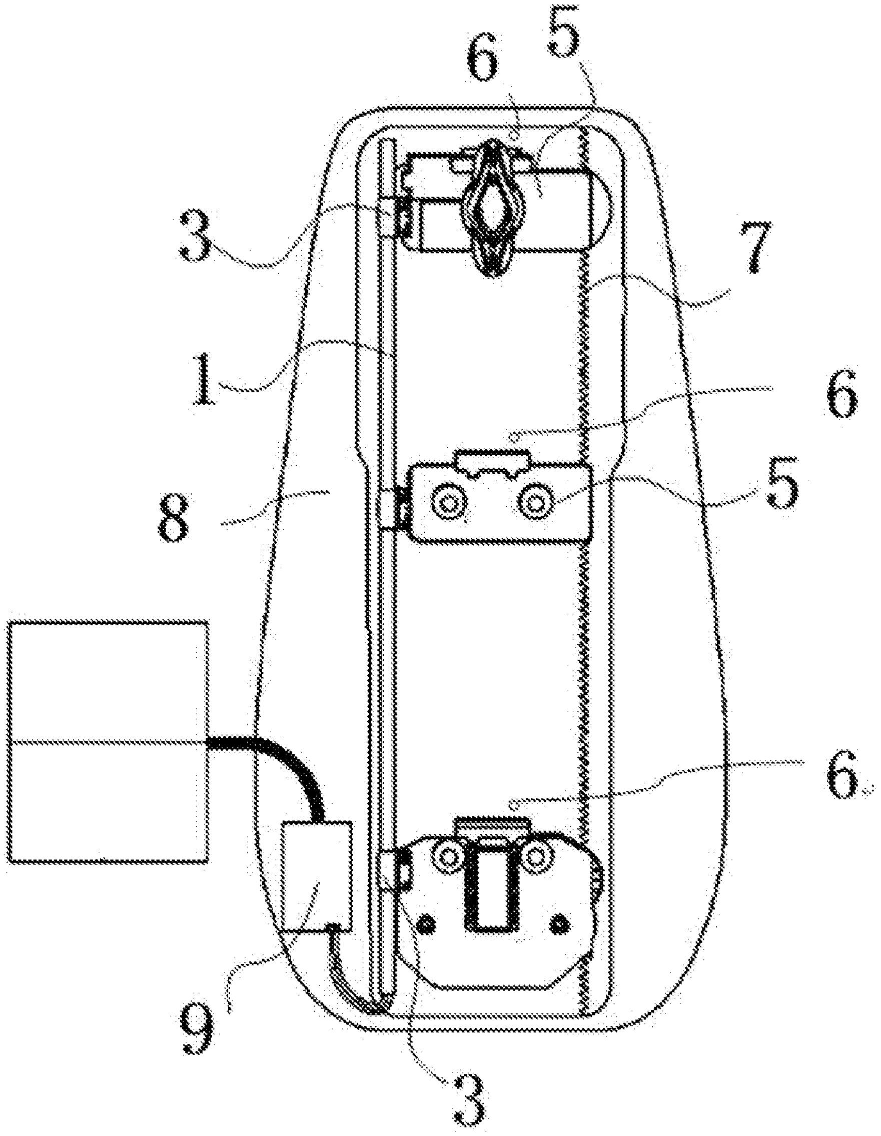
FIG. 6 is a schematic structural diagram of a massage cushion of the present disclosure.

As shown in FIGS. 1-6, a specific embodiment of the present disclosure is a flexible sliding power supply assembly, including a flexible conductive rail 1 and a sliding conductive assembly 3. The flexible conductive rail 1 is provided with two or more fixing slots 4, and conductive bars 2 are mounted in the fixing slots 4 in an embedded manner.

A sliding conductive assembly 3 is mounted on the flexible conductive rail 1; the sliding conductive assembly 3 is in slidably electric connection with the conductive bars 2; and the conductive bars 2 are correspondingly electrically connected to a power supply and a controller 9.

The sliding conductive assembly 3 includes a probe control sleeve 301, conductive probes 302, and a circuit board 303; the circuit board 303 is mounted in the probe control sleeve 301; and the circuit board 303 is electrically connected with a plurality of conductive probes 302. The probe control sleeve of the present disclosure is of a tunnel type structure. The tunnel type probe control sleeve can ensure that an assembly will not be loosened and fall off from the flexible conductive rail and can also ensure that the conductive probes are always kept in a stable electric connection state during vibration. During use, under squeezing, the probe control sleeve can also move with the flexible conductive rail to keep the stable electric connection. The traditional conductive rail adopts a rigid rail, which cannot adapt to a vibration environment of a massager and a squeezed usage scenario.

The middle part of the probe control sleeve 301 is a connecting opening 304; by the connecting opening 304, the probe control sleeve can be mounted on the flexible conductive rail 1; and the conductive probes 302 protrude from the connecting opening 304 and are electrically connected to the conductive bars 2 on the flexible conductive rail 1.

One side of the probe control sleeve 301 is provided with a connecting part 305 fixedly connected to a massage movement 5; and each conductive bar 2 is correspondingly electrically connected to one or more conductive probes 302. Each conductive probe 302 is formed by combining a copper pin, a wire and a spring. Meanwhile, a plurality of conductive probes can enlarge a contact area, which can meet a requirement for high current.

One or more magnets 6 are mounted on an operating rail of the massage movement 5 on a back shell of a cushion body in an embedded manner; a hall switch is mounted on the circuit board of the massage movement 5; and the hall switch can determine the position of the movement by sensing a magnetic field formed by the magnets 6.

The fixing slots 4 are “凹”-shaped; each fixing slot 4 includes a fixed part 401 and an opening part 402; a width and thickness of the fixed part 401 are both equal to those of each conductive bar 2; a width of the opening part 402 is less than that of the conductive bar 2; and a thickness of the opening part 402 is less than an extending height of the copper pin.

A massage cushion adopts the flexible sliding power supply assembly. The flexible conductive rail is fixedly mounted on a cushion body 8; the other side of the cushion body 8 is further provided with a rack 7; and one or more massage movements 5 are mounted between the flexible conductive rail 1 and the rack 7.

One side of each massage movement 5 is meshed with the rack 7; the other side of the massage movement 5 is fixedly provided with the sliding assembly 3; and the massage movement 5 is electrically connected with each conductive bar through the sliding conductive assembly 3.

The fixing slots 4 of the flexible conductive rail 1 are inwardly disposed; the circuit board 303 of the probe control sleeve 301 and one side of each conductive probe 302 is inwardly disposed; and a massage head on each massage movement 5 is outwardly disposed.

An upper surface and a lower surface of the probe control sleeve 301 are both of arc curved structures.

A control method is applied to a massage cushion. The flexible conductive rail is provided with three conductive bars; two conductive bars are used for supplying power, and the third conductive bar is used for controlling signals; the conductive bars are also electrically connected with a controller; the circuit board is also electrically connected with an MCU; and the control method specifically includes the following steps:

S1, control: issuing, by means of a mobile phone or the controller, an instruction; encoding the instruction through a communication protocol; transmitting the encoded instruction to the MCU via a specified conductive bar; and decoding, by the MCU, the encoded instruction to control the massage movement to perform a specified action; and S2, feedback: when the massage movement switches a mode or stops working, encoding, by the MCU, a state; transmitting the encoded state to the controller via a specified conductive bar; and decoding, by a central processing unit (CPU) on the controller, the encoded state to obtain a working state of the massage movement.

The control method further includes step S3, positioning: sensing, by the MCU, a magnet on a back shell rail of the cushion body through the hall switch on the circuit board; after the MCU determines the position of the massage movement, encoding, by the MCU, position information; transmitting the encoded position information to the controller via a specified conductive bar; and decoding, by the CPU on the controller, the encoded position information to obtain the position information of the massage movement.

When the movement of the traditional massage cushion walks up and down to achieve massage, a connecting wire is easy to break due to a bend. The following problems are solved: When the movement of the massage cushion walks up and down to achieve massage, since the connecting spring-shape wire has a large diameter, the diameter of the spring-shape wire is extremely large during making of an ultrathin structure, and a person will squeeze the spring-shape wire when the person leans against the massage cushion. As a result, the existing fixed conductive guide rail is pulled apart since the wire is not extensible, and the adaptability is poor. Special conductive guide rails are required to be designed for use for different massage cushions, and special molds need to be opened to manufacture the conductive guide rails. An existing guide rail conduction device is fixed in a pressed manner. The conduction device is easy to jump when moving along a conductive rail, resulting in poor intermittent contact, affecting power supplying and signal transmission, and causing part of signals to be lost. The pressed fixed guide rail has the risk of derailment. For example, in a novel conductive structure of a massage chair movement ZL201820665485.X, its conductive assembly cannot be applied to a flexible conductive rail. If the conductive assembly is forcibly combined with the flexible conductive rail, the conductive assembly is squeezed to easily cause derailment or poor contact. The existing guide rail adopts a single carbon brush (or conductive pillar) to contact a conductive metal bar on the guide rail to achieve electricity or signal transmission. When there is debris such as dust on the conductive bar, the conduction device is easy to jump, resulting in poor intermittent contact, which affects the power supplying and signal transmission and causes part of signals to be lost.

The flexible conductive rail of the present disclosure is made of high-toughness engineering plastic. The flexible conductive rail can bend in a large arc in one direction to adapt to massage chairs with different shapes, so that the adaptability is good, and it can be used for both a common cushion and a curved cushion. In the flexible conductive rail, the tunnel type sliding conductive assembly can be made to be a standard component, thus adapting to various kinds of cushions, reducing the development cost, facilitating the assembling, reducing the kinds of materials, and decreasing the product cost. The flexible conductive rail is connected by the tunnel type probe control sleeve structure, so that reliable fixing is achieved during sliding guidance, and the problem of derailment is completely solved. Each conductive bar corresponds to two conductive probes. The parallel conductive probes have good contact-conducting stability, so that the problem of poor contact easily caused in the existing fixed conductive rail is solved. In the flexible conductive rail of the present disclosure, one controller can be connected to a plurality of massage movements with the tunnel type sliding conductive assemblies by only three conductive bars, so that the number of wires is reduced, and the problems of breakage of wires, of the massage cushion and twining of the wires on a massage head are completely solved. The flexible conductive rail has a normative appearance and a compact structure, and the moving trajectory can be fixed according to the movement. The sliding conductive assembly is located on a side surface. One protruding end of the circuit board of the sliding conductive assembly is located on an inner side, and at the same time, the upper and lower end parts of the sliding conductive assembly are both arc-shaped, so that a position where a person easily squeezes can be bypassed; a product has more stable quality; and the person feels more comfortable during massage.

The above descriptions are only the preferred embodiments of the present disclosure, and are not intended to limit the present disclosure. Any subtle modifications, equivalent replacements and improvements that are made to the above embodiments according to the technical essence of the present disclosure shall fall within the protection scope of the technical solution of the present disclosure.

What is claimed is:

1. A flexible sliding power supply assembly, comprising a flexible conductive rail and a sliding conductive assembly, wherein the flexible conductive rail is provided with two or more fixing slots; conductive bars are mounted in the fixing slots in an embedded manner;

the sliding conductive assembly is mounted on the flexible conductive rail; the sliding conductive assembly is in slidably electric connection with the conductive bars; and the conductive bars are correspondingly electrically connected to a power supply and a controller;

wherein the sliding conductive assembly comprises a probe control sleeve, a plurality of conductive probes, and a circuit board; the circuit board is mounted in the probe control sleeve; the circuit board is electrically connected with the plurality of conductive probes;

a middle part of the probe control sleeve is a connecting opening; by the connecting opening, the probe control sleeve is capable of being mounted on the flexible conductive rail; and the plurality of conductive probes protrude from the connecting opening and are electrically connected to the conductive bars on the flexible conductive rail.

2. The flexible sliding power supply assembly according to claim 1, wherein one side of the probe control sleeve is provided with a connecting part fixedly connected to a massage movement; and each conductive bar is correspondingly electrically connected to one or more conductive probes.

3. The flexible sliding power supply assembly according to claim 2, wherein the fixing slots are “凹”-shaped; each fixing slot comprises a fixed part and an opening part; a width and thickness of the fixed part are both equal to those of each conductive bar; a width of the opening part is less than that of the conductive bar; and a thickness of the opening part is less than an extending height of the conductive probe.

4. The flexible sliding power supply assembly according to claim 1, wherein one or more magnets are mounted on the flexible conductive rail in an embedded manner; a hall switch is mounted on the circuit board; and the hall switch is capable of determining a position of a massage movement by sensing a magnetic field formed by the magnets.

5. A massage cushion, comprising:

a flexible sliding power supply assembly comprising a flexible conductive rail and a sliding conductive assembly, wherein the flexible conductive rail is provided with two or more fixing slots; conductive bars are mounted in the fixing slots in an embedded manner;

wherein the sliding conductive assembly is mounted on the flexible conductive rail; the sliding conductive assembly is in slidably electric connection with the conductive bars; and the conductive bars are correspondingly electrically connected to a power supply and a controller;

wherein the sliding conductive assembly comprises a probe control sleeve, a plurality of conductive probes, and a circuit board; the circuit board is mounted in the probe control sleeve; the circuit board is electrically connected with the plurality of conductive probes;

a middle part of the probe control sleeve is a connecting opening; by the connecting opening, the probe control sleeve is capable of being mounted on the flexible conductive rail; and the plurality of conductive probes protrude from the connecting opening and are electrically connected to the conductive bars on the flexible conductive rail;

wherein the flexible conductive rail is fixedly mounted on a cushion body; another side of the cushion body is further provided with a rack; one or more massage movements are mounted between the flexible conductive rail and the rack;

one side of each massage movement is meshed with the rack; another side of each massage movement is fixedly provided with the sliding conductive assembly; and the massage movement is electrically connected with each conductive bar through the sliding conductive assembly.

6. The massage cushion according to claim 5, wherein the fixing slots of the flexible conductive rail are inwardly disposed; the circuit board of the probe control sleeve and one side of each conductive probe is also inwardly disposed; a massage head on each massage movement is outwardly disposed; and an upper surface and a lower surface of the probe control sleeve are both of arc curved structures.

7. The massage cushion according to claim 5, wherein one side of the probe control sleeve is provided with a connecting part fixedly connected to the massage movement; and each conductive bar is correspondingly electrically connected to one or more conductive probes.

8. The massage cushion according to claim 7, wherein the fixing slots are "凹"-shaped; each fixing slot comprises a fixed part and an opening part; a width and thickness of the fixed part are both equal to those of each conductive bar; a width of the opening part is less than that of the conductive bar; and a thickness of the opening part is less than an extending height of the conductive probe.

9. The massage cushion according to claim 5, wherein one or more magnets are mounted on the flexible conductive rail in an embedded manner; a hall switch is mounted on the circuit board; and the hall switch is capable of determining a position of the massage movement by sensing a magnetic field formed by the magnets.

10. A control method, which is applied to the massage cushion according to claim 5, wherein the flexible conductive rail is provided with three conductive bars; two conductive bars are used for supplying power, and the third conductive bar is used for controlling signals; the conductive bars are also electrically connected with the controller; the circuit board is also electrically connected with a micro control unit (MCU); and the control method specifically comprises the following steps:

S1, control: issuing, by means of a mobile phone or the controller, an instruction; encoding the instruction through a communication protocol; transmitting the encoded instruction to the MCU via a specified conductive bar; and decoding, by the MCU, the encoded instruction to control the massage movement to perform a specified action; and S2, feedback: when the massage movement switches a mode or stops working, encoding, by the MCU, a state; transmitting the encoded state to the controller via a specified conductive bar; and decoding, by a central processing unit (CPU) on the controller, the encoded state to obtain a working state of the massage movement.

11. The control method according to claim 10, further comprising step S3, positioning: sensing, by the MCU, a magnet on a back shell rail of the cushion body through a hall switch on the circuit board; after the MCU determines a position of the massage movement, encoding, by the MCU, position information; transmitting the encoded position information to the controller via a specified conductive bar; and decoding, by the CPU on the controller, the encoded position information to obtain the position information of the massage movement.

* * * * *